US012617189B2

(12) United States Patent (10) Patent No.: US 12,617,189 B2
Imanishi et al. (45) Date of Patent: May 5, 2026

(54) POLYPROPYLENE FILM, LAMINATE, PACKAGING MATERIAL, AND PACKING BODY

(71) Applicant: Toray Industries, Inc., Tokyo (JP)

(72) Inventors: Yasuyuki Imanishi, Otsu (JP); Masatoshi Ohkura, Otsu (JP); Haruki Aono, Otsu (JP)

(73) Assignee: Toray Industries, Inc., Tokyo (JP)

( * ) Notice: Subject to any disclaimer, the term of this patent is extended or adjusted under 35 U.S.C. 154(b) by 292 days.

(21) Appl. No.: 18/036,952

(22) PCT Filed: Dec. 20, 2021

(86) PCT No.: PCT/JP2021/046933
§ 371 (c)(1),
(2) Date: May 15, 2023

(87) PCT Pub. No.: WO2022/138531
PCT Pub. Date: Jun. 30, 2022

(65) Prior Publication Data
US 2023/0415463 A1 Dec. 28, 2023

(30) Foreign Application Priority Data

Dec. 23, 2020 (JP) ................................. 2020-213306

(51) Int. Cl.
| | |
|---|---|
| *B65D 65/40* | (2006.01) |
| *B32B 27/08* | (2006.01) |
| *B32B 27/16* | (2006.01) |
| *B32B 27/32* | (2006.01) |
| *C08L 23/12* | (2006.01) |

(52) U.S. Cl.
CPC .............. *B32B 27/08* (2013.01); *B32B 27/16* (2013.01); *B32B 27/32* (2013.01); *B65D 65/40* (2013.01); *C08L 23/12* (2013.01); *B32B 2250/03* (2013.01); *B32B 2250/242* (2013.01); *B32B 2255/10* (2013.01); *B32B 2255/205* (2013.01); *B32B 2270/00* (2013.01); *B32B 2307/31* (2013.01); *B32B 2307/518* (2013.01); *B32B 2307/538* (2013.01); *B32B 2307/7244* (2013.01); *B32B 2307/7246* (2013.01); *B32B 2307/7376* (2023.05); *B32B 2307/746* (2013.01); *B32B 2553/00* (2013.01); *C08L 2203/162* (2013.01); *C08L 2203/30* (2013.01)

(58) Field of Classification Search
None
See application file for complete search history.

(56) References Cited

U.S. PATENT DOCUMENTS

| | | | | |
|---|---|---|---|---|
| 4,869,938 A | * | 9/1989 | Usami ................... | B29C 48/022 |
| | | | | 428/34.3 |
| 6,033,514 A | * | 3/2000 | Davis ...................... | B32B 27/32 |
| | | | | 156/244.11 |

FOREIGN PATENT DOCUMENTS

| | | | |
|---|---|---|---|
| JP | 2001040111 A | | 2/2001 |
| JP | 2005205786 A | | 8/2005 |
| JP | 2009299022 A | | 12/2009 |
| JP | 2010042665 A | | 2/2010 |
| JP | 2014055283 A | | 3/2014 |
| JP | 2015-077783 | * | 4/2015 |
| JP | 2016068417 A | | 5/2016 |
| JP | 2016182774 A | | 10/2016 |
| JP | 2020036007 A | | 3/2020 |
| JP | 2020040361 A | | 3/2020 |
| WO | 2018147334 A1 | | 8/2018 |
| WO | 2018181011 A1 | | 10/2018 |

OTHER PUBLICATIONS

Translation of JP 2015077783.*
CAS Data Sheet fpr polymethylpentent.*
International Search Report and Written Opinion for International Application No. PCT/JP2021/046933, dated Feb. 22, 2022, 6 pages.

* cited by examiner

*Primary Examiner* — Alicia Chevalier
(74) *Attorney, Agent, or Firm* — Buchanan Ingersoll & Rooney PC

(57) ABSTRACT

The present invention addresses the problem of providing a polypropylene film which is structurally stable to heat in deposition when used for packaging, and has appropriate slipperiness without using an anti-blocking agent or particles, and thus has excellent water vapor barrier properties and oxygen barrier properties, in particular, when a transparent deposited layer is laminated. Moreover, the present invention provides a polypropylene film characterized by having at least two types of layers (A layer and B layer) containing a polypropylene-based resin as a main component, wherein the B layer contains a thermoplastic resin incompatible with a polypropylene-based resin, and when the skewnesses Ssk of the A layer and the B layer, as measured through three-dimensional noncontact surface shape measurement, are Ssk (A) and Ssk (B), respectively, the Ssk (B) is at least 5 and the Ssk (A) is less than 5.

12 Claims, No Drawings

POLYPROPYLENE FILM, LAMINATE, PACKAGING MATERIAL, AND PACKING BODY

CROSS REFERENCE TO RELATED APPLICATIONS

This is the U.S. National Phase application of PCT/JP2021/046933, filed Dec. 20, 2021, which claims priority to Japanese Patent Application No. 2020-213306, filed Dec. 23, 2020, the disclosures of each of these applications being incorporated herein by reference in their entireties for all purposes.

FIELD OF THE INVENTION

The present invention relates to a polypropylene film, a laminate, a packaging material, and a package that are particularly suitable for the purpose of packaging.

BACKGROUND OF THE INVENTION

Having high transparency, good mechanical characteristics, and good electric characteristics, polypropylene films have been applied in various fields including packaging materials, tape materials, and electric insulation materials such as wire wrapping and capacitors. For packaging materials that require gas barrier properties, in particular, laminated films produced by vapor-depositing a thin layer of aluminum (hereinafter occasionally referred to as Al) on a polypropylene film have been used widely. However, films obtained by Al vapor deposition are opaque and accordingly, they are not suitable for applications in which the contents have to be visible. Moreover in recent years, there has been a growing movement to recycle packaging plastics, but films containing Al vapor deposition layers are not sufficiently high in recyclability because it is difficult to visually distinguish them from Al-foil laminated films and also because they tend to be colored after recycling, which poses a problem to solve.

In view of the above, there is a movement to replace the conventional Al vapor deposition layers with transparent vapor deposition layers of aluminum oxide (hereinafter occasionally referred to as AlOx), silicon oxide, or the like. The use of these transparent vapor deposition layers serves to provide transparent packaging materials and achieve increased recyclability. However, since these transparent vapor deposition layers are generally thinner and more fragile than the Al vapor deposition layers, the vapor deposition layers may be peeled off during the formation of vapor deposition layers or in downstream steps such as for bag making, and defects such as pinholes and cracks may occur in the vapor deposition layers, easily leading to problems such as deterioration in the water vapor barrier property, oxygen barrier property, or the like.

A suitable degree of transportability is required during the vapor deposition step, bag making step, etc., and this is now achieved by, for example, adding an anti-blocking agent, particles, etc. to a surface layer of the film, so that the film has a rough surface to ensure high lubricity. In these processed films having vapor deposition layers, however, rigid protrusions result from the addition of an anti-blocking agent or particles described above. Accordingly, problems with defects and damages such as scrapes, pinholes, and cracks can occur in the vapor deposition layers that come in contact with each other during transportation of a product in the form of a wound roll, easily leading to problems such as deterioration in the water vapor barrier property, oxygen barrier property, or the like.

To provide polypropylene films suitable for packaging applications, there have been conventional proposals such as films produced by controlling the molecular weight of a polypropylene resin material to increase its rigidity in order to produce a polypropylene film with an increased degree of plane orientation (for example, Patent document 1) and films having improved water vapor barrier property due to an increased degree of plane orientation achieved by adopting a high crystallinity raw material and a high degree of stretching in the length direction or performing a second longitudinal stretching in the length direction after biaxial stretching (for example, Patent document 2). In addition, for the purpose of carrying out suitable vapor deposition and achieving an appropriate transportability in the bag making step during the process for producing a packaging material, there have been other proposals such as films with lubricity developed by forming a rough surface containing particles (for example, Patent document 3) and films with lubricity improved by further controlling the thickness of each layer in a laminated film having particle-containing surface layer (for example, Patent document 4). As compared with this, for the purpose of developing lubricity without adding particles to a polypropylene film designed for release from adhesion, there is proposal of a film that is produced by dispersing a non-polypropylene resin with a high melting point in the surface layer of a polypropylene film (for example, Patent document 5).

PATENT DOCUMENTS

Patent document 1: Japanese Unexamined Patent Publication (Kokai) No. 2014-055283

Patent document 2: Japanese Unexamined Patent Publication (Kokai) No. 2001-040111

Patent document 3: Japanese Unexamined Patent Publication (Kokai) No. 2020-040361

Patent document 4: International Publication WO 2018/181011

Patent document 5: International Publication WO 2018/147334

SUMMARY OF THE INVENTION

However, since the polypropylene films described in Patent documents 1 and 2 have a monolayer structure, the surface roughness of each of the two film surfaces cannot be controlled separately, leading to insufficient control of the fibril protrusion height. Therefore, when stacking a plurality of transparent vapor deposition layers, in particular, the vapor deposition layers may fail to develop sufficient adhesion, form a homogeneous film, etc., leading to the problem of deterioration in water vapor barrier property, oxygen barrier property, etc. In the polypropylene films described in Patent documents 3 and 4, the heat seal layer contains particles, and if the other surface is covered with a vapor deposition layer, the vapor deposition layer may be damaged and suffer defects such as scrapes, pinholes, and cracks. Furthermore, in the film proposed in Patent document 5, resins having melting points that are different from and higher than that of the polypropylene resin are dispersed on the two surfaces of the polypropylene film so that both surfaces of the film have irregularities. However, they are not controlled appropriately on both surfaces and there is no technical concept for stabilization against heat at the formation of vapor deposition layers on the surfaces. As a result, there may occur the problems of insufficient adhesion of vapor deposition layers and low homogeneity of the film, leading to deterioration in water vapor barrier property, oxygen barrier property, etc.

Thus, the main object of the present invention is to provide a polypropylene film that is structurally stable against heat at the formation of the vapor deposition step performed in producing a packaging material therefrom and has moderate slipperiness that is developed without using an anti-blocking agent, particles, or the like, so that it develops good water vapor barrier property, good oxygen barrier property, etc., particularly after laying a transparent vapor deposition layer thereon.

The inventors of the present invention conducted extensive studies to solve the above problems, and arrived at the present invention, namely, the first polypropylene film according to the present invention and the second polypropylene film according to the present invention described below.

The first polypropylene film according to embodiments of the present invention is a polypropylene film including at least two types of layers (layer A and layer B) that contain polypropylene based resins as primary components wherein the layer B contains a resin that is incompatible with the polypropylene based resins and wherein Ssk(B) is 5 or more and Ssk(A) is less than 5 where Ssk(A) and Ssk(B) are the skewness Ssk of the layer A and that of the layer B, respectively, as determined by using a three dimensional noncontact surface profile measuring instrument.

The second polypropylene film according to embodiments of the present invention is a polypropylene film including at least two types of layers (layer A and layer B) that contain polypropylene based resins as primary components wherein the layer B contains a thermoplastic resin that is incompatible with the polypropylene based resins and wherein Ssk(A) is less than 5 and, in addition, Sa(A) and Sa(B) meet the equation 1 where Ssk(A) is the skewness Ssk of the layer A while Sa(A) and Sa(B) are the surface roughness Sa of the layer A and that of the layer B, respectively, as determined by using a three dimensional noncontact surface profile measuring instrument.

$$Sa(B)/Sa(A) > 1.1 \qquad \text{equation 1}$$

The present invention serves to provide a polypropylene film that is structurally stable against heat used in the vapor deposition step and has moderate slip property that is developed without using an anti-blocking agent, particles, or the like, so that it develops good water vapor barrier property, oxygen barrier property, etc., particularly after laying a transparent vapor deposition layer thereon.

DETAILED DESCRIPTION OF EMBODIMENTS OF THE INVENTION

The polypropylene film according to embodiments of the present invention is described in detail below. For the present invention, it should be noted that the length direction referred to in relation to the production of a polypropylene film is the traveling direction of the film and, in the case of a roll of a polypropylene film formed by winding, it is the winding direction of the roll. Furthermore, the width direction is the in-plane direction in the film that is perpendicular to the length direction.

The first polypropylene film according to embodiments of the present invention is characterized by including at least two types of layers (layer A and layer B) that contain polypropylene based resins as primary components wherein the layer B contains a resin that is incompatible with the polypropylene based resins and wherein Ssk(B) is 5 or more and Ssk(A) is less than 5 where Ssk(A) and Ssk(B) are the skewness Ssk of the layer A and that of the layer B, respectively, as determined by using a three dimensional noncontact surface profile measuring instrument.

The second polypropylene film according to embodiments of the present invention is characterized by including at least two types of layers (layer A and layer B) that contain polypropylene based resins as primary components wherein the layer B contains a thermoplastic resin that is incompatible with the polypropylene based resins and wherein Ssk(A) is less than 5 and, in addition, Sa(A) and Sa(B) satisfy the equation 1 where Ssk(A) is the skewness Ssk of the layer A while Sa(A) and Sa(B) are the surface roughness Sa of the layer A and that of the layer B, respectively, as determined by using a three dimensional noncontact surface profile measuring instrument.

$$Sa(B)/Sa(A) > 1.1 \qquad \text{equation 1}$$

Hereinafter, the first and the second polypropylene film according to embodiments of the present invention will be occasionally referred to generically as embodiments of the present invention or the polypropylene film according to embodiments of the present invention. It should be noted here that as described later, Ssk(A), Ssk(B), Sa(A), and Sa(B) are parameters that represent the shape and roughness of a surface, and therefore, both the layer A and the layer B are the outermost layers.

For exemplary embodiments of the present invention, a polypropylene film means a sheet-like molded article in which the polypropylene based resin accounts for 80 mass % or more and less than 100 mass %, preferably 80 mass % or more and 99.9 mass % or less, of the total mass, which accounts for 100 mass %, of all components. A polypropylene based resin means a resin in which propylene units account for 90 mol % or more and 100 mol % or less of the total quantity, which accounts for 100 mol %, of all component units that constitute the resin. A "layer containing a polypropylene based resin as primary component" means a layer in which polypropylene based resin accounts for more than 50 mass % and 100 mass % or less of the total mass, which accounts for 100 mass %, of all component components. The term "primary component" can be construed in the same way. The expression "including at least two types of layers (layer A and layer B) that contain polypropylene based resins as primary components" suggests that a plurality of layers each containing a polypropylene based resin as primary component is included and that at least one of the layers has a component constitution different from another.

A good method to allow a polypropylene film to have a high lubricity surface is to add an antiblocking agent or particles. With this method, the use of an antiblocking agent or particles works to form protrusions on the film surface that ensures high processability when performing vapor deposition, bag making, etc. On the other hand, in the case of a roll-like product that can be regarded as a stack of films having vapor deposition layers on their surfaces, the aforementioned protrusions formed by an antiblocking agent or particles are so rigid that defects and damages such as scrapes, pinholes, and cracks can be formed in the adjacent vapor deposition layers, possibly leading to problems such as deterioration in the water vapor barrier property, oxygen barrier property, or the like.

To develop lubricity, other methods than the addition of an antiblocking agent or particles include the use of the crystalline modification technique, which has been adopted generally as a preferable method. In more detail, after the melt extrusion step in a film production process, the molten resin composition is solidified on a casting (cooling) drum adjusted to a high temperature, 60° C. or higher for example, to form β-crystal based spherulites, followed by carrying out a stretching step to cause crystal modification of the β-crystals, which are thermally unstable, into α-crystals, thereby forming irregularities on the film surface. For the polypropylene film according to embodiments of the present invention, however, the film surface to undergo vapor deposition treatment should be a smooth surface in order to form a uniform, homogeneous vapor deposition film and achieve good water vapor barrier property, good oxygen barrier property, etc., and accordingly, it is preferable for the casting step to be performed at a low temperature. In some cases, furthermore, a polyolefin based resin with a low crystallinity and a low melting point is used in the surface of a heat seal layer, and in such cases, it may be difficult to apply the technique that performs crystal modification.

Thus, from the viewpoint of developing lubricity while avoiding the aforementioned problems, it is essential for the polypropylene film according to embodiments of the present invention to include at least two types of layers (layer A and layer B) that contain polypropylene based resins as primary components and also that the layer B contains a thermoplastic resin that is incompatible with the polypropylene based resins.

The blending of a polypropylene based resin with a thermoplastic resin that is incompatible with the polypropylene based resin serves to allow the surface of the polypropylene film (the layer B) to have surface irregularities that represent its domain structure. In the film production process, furthermore, if the solidification of the melt-extruded resin on a cooling drum is performed at a temperature of 10° C. or more and 40° C. or less, preferably 10° C. or more and 35° C. or less, more preferably 10° C. or more and 30° C. or less, and particularly preferably 10° C. or more and 25° C. or less, it serves to allow fine α-crystal based spherulites or mesophase structures to be formed preferentially to suppress the formation of irregularities that are attributed to the aforementioned β-crystals. It should be noted that hereinafter a thermoplastic resin that is incompatible with the polypropylene based resins will be occasionally referred to as an "incompatible resin".

Preferable incompatible resins include, for example, polymethylpentene based resins. Here, for the layer B that contains a polypropylene based resin and an incompatible resin, if the size of the α-crystal based spherulites are minimized or the polypropylene based resin component is entirely or partly in a mesophase, it serves to prevent the incompatible resin domain and the polypropylene based resin from suffering boundary separation when they are stretched. If boundary separation is suppressed, surface protrusions can be formed while preventing the whitening of the polypropylene film, and it also serves to reduce uneven deposition that may arise from creasing in the vapor deposition step and avoid the formation of creases attributable to conveyance in the bag making step, leading to high processability.

For the layer B present in the polypropylene film according to embodiments of the present invention, it is preferable for the incompatible resin to account for 0.1 mass % or more and 10 mass % or less of the entire layer, which accounts for 100 mass %. The content is more preferably 0.5 mass % or more and 6 mass % or less, still more preferably 1 mass % or more and 4 mass % or less, and most preferably 1 mass % or more and 2 mass % or less. If the incompatible resin accounts for 0.1 mass % or more of the layer B, surface protrusions are formed efficiently on the surface of the layer B, thereby allowing the surface of the layer B to have high slipperiness and reducing creases attributable to conveyance in the vapor deposition step, the bag making step, etc. On the other hand, if the incompatible resin accounts for 10 mass % or less of the layer B, excessive domain formation in the layer B is suppressed to serve for suppressing the decrease in transparency attributable to excessive void formation that may occur at the interfaces between resin regions in the stretching step. Here, there are no specific limitations on the content (mass %) of the incompatible resin in the layer A, but in order for the value of Ssk(A), which will be described later, to be smaller than the value of Ssk(B), the aforementioned content is preferably smaller than the content (mass %) of the incompatible resin in the layer B, and an embodiment in which the layer A does not contain an incompatible resin is also preferable.

For the polypropylene film according to embodiments of the present invention, the use of a polymethylpentene based resin as the incompatible resin is particularly preferable because it is relatively high in affinity with polypropylene based resins and useful to realize a decreased domain size. In addition, it is preferable for the polymethylpentene based resin to have a melting point of 185° C. to 240° C., more preferably 220° C. to 240° C., from the viewpoint of the stability of extrusion of its blend with polypropylene and in order to cause surface irregularities by utilizing a domain sea-island structure. In view of these features, the polypropylene film according to embodiments of the present invention is preferably a polymer that contains 4-methylpentene-1 as primary constituent unit (the constituent unit that accounts for 80 mol % or more and 100 mol % or less of the total quantity, which accounts for 100 mol %, of all constituent units), and preferable examples include products of TPX (registered trademark) series supplied by Mitsui Chemicals, Inc. such as TPX (registered trademark) MX series, TPX (registered trademark) DX series, and TPX (registered trademark) RT series. More specifically, TPX (registered trademark) MX002, MX004, DX310, DX845, and RT31 are preferable from the viewpoint of its relatively high affinity with polypropylene based resins and suitability for domain size reduction.

From the viewpoint of realizing both high lubricity and good barrier properties, it is important for the first polypropylene film according to embodiments of the present invention that Ssk(B) be 5 or more while Ssk(A) be less than 5 wherein Ssk(A) and Ssk(B) are the skewness Ssk of the layer A and that of the layer B, respectively, as determined by using a three dimensional noncontact surface profile measuring instrument. From the same viewpoint, it is important that Ssk(A) be less than 5 for the second polypropylene film according to embodiments of the present invention as well.

Here, the skewness Ssk (hereinafter occasionally referred to simply as Ssk) is a parameter that represents the asymmetry of distribution of surface protrusion shapes determined by three dimensional noncontact surface profile measurement. The parameter Ssk is the cubic mean of $Z(x,y)$ values on a reference plane developed by normalization by the cube of root mean square height Sq. It represents skewness and serves as an indicator of symmetry of the asperities and valleys above and below the average plane. When Ssk<0, higher asymmetry occurs below the average line, which means that a larger number of valleys exist than asperities. When Ssk>0, on the other hand, higher asymmetry occurs above the average line, which means that a larger number of asperities exist than valleys. When Ssk=0, furthermore, there is no asymmetry with respect to the average line.

The Ssk values (Ssk(A), Ssk(B), and Ssk(D) described later) can be determined by using a generally known measuring instrument for three dimensional noncontact surface profile, and good measuring apparatuses include, for example, scanning white light interference microscope (VS1540, manufactured by Hitachi High-Tech Science Corporation). Detailed measurement and analysis conditions for using such a measuring apparatus are described in Examples of the invention given below.

If Ssk(B) is 5 or more in the first polypropylene film according to embodiments of the present invention, moderate asperities are present on the surface of the layer B to realize favorable slippage between polypropylene films or between a polypropylene film and the conveyance roller. If Ssk(A) is less than 5, on the other hand, a less number of asperities and a moderate number of valleys are present on the surface of the layer A, and accordingly, in the layer formed (the layer D described later), the vapor deposited metal and/or inorganic compounds account for more than 50 mass % and 100 mass % or less in total. Thus, the number of protruding asperities is small to form a layer with uniform height. As a result, the layer D suffers less numbers of defects such as pinholes and cracks and can show enhanced barrier properties.

For the second polypropylene film according to embodiments of the present invention as well, if Ssk(A) is decreased to less than 5, the same effects as in the case of the first polypropylene film with an Ssk(A) of less than 5 can be realized.

In view of the above description, it is preferable for the first polypropylene film to have an Ssk(B) of 7 or more, more preferably 10 or more. There are no specific limitations on the upper limit, but it is 25 from the viewpoint of practicability and preferably 20 in order to ensure moderate handleability while suppressing uneven deposition that may arise from creasing in the vapor deposition step and preventing the formation of creases in the bag making step. On the other hand, Ssk(A) is preferably 0 or less, more preferably −5 or less, in order to allow the laminated product having the layer D to have a small water vapor transmission rate and a small oxygen transmission rate to realize sufficient barrier properties. There are no specific limitations on the lower limit, but it is −20 from the viewpoint of practicability.

For the second polypropylene film according to embodiments of the present invention as well, Ssk(A) is preferably 0 or less, and more preferably −5 or less, for the same reason. There are no specific limitations on the lower limit, but it is −20 from the viewpoint of practicability.

For the first polypropylene film according to embodiments of the present invention, good methods to control Ssk(B) in the aforementioned range include, for example, blending the polypropylene based resin and the resin incompatible with the polypropylene based resin at a ratio in a preferable range, followed by stretching under properly adjusted conditions. Adoptable stretching conditions include sequential biaxial stretching at a stretching ratio of 4.0 or more, preferably 4.5 or more, in the length direction. They also include a length-directional stretching temperature of 125° C. or less, preferably 120° C. or less, more preferably 115° C. or less, and still more preferably 105° C. or less. Here, these stretching conditions may be adopted either singly or in combination.

On the other hand, for the first and second polypropylene films according to embodiments of the present invention, good methods to control Ssk(A) in the aforementioned range include, for example, the use of a polypropylene based resin having a high degree of crystallinity (more specifically, a polypropylene based resin having a mesopentad fraction of 0.93 or more) as material of the layer A or a polypropylene based resin having a melting point of 151° C. or more (preferably 160° C. or more) in combination with the adoption of properly adjusted film production conditions and stretching conditions. As preferably adoptable film production conditions, the surface of the layer A in the molten sheet is allowed to come down to touch the surface of the cooling drum in the film production process while adjusting the cooling solidification temperature to 35° C. or less, preferably 30° C. or less. Adoptable stretching conditions include sequential biaxial stretching at a stretching ratio of 4.0 or more, preferably 4.5 or more, in the length direction or at a length-directional stretching temperature of 125° C. or less, preferably 120° C. or less, more preferably 115° C. or less, and still more preferably 105° C. or less. Here, these film production conditions and stretching conditions may be adopted either singly or in combination.

For the polypropylene film according to embodiments of the present invention, the propylene unit fraction in the resin component present in the layer A is 97.0 mol % or more and 100.0 mol % or less, and it is preferably equal to or greater than the propylene unit fraction in the resin component present in the entire polypropylene film. Here, the "propylene unit fraction in the resin component present in the layer A" means the fraction (mol %) accounted for by the propylene unit present in the layer A relative to all constituent units, which account for 100 mol %, in the resin component in the layer A. Furthermore, the "propylene unit fraction in the resin component present in the entire polypropylene film" means the fraction (mol %) accounted for by the propylene unit present in the polypropylene film relative to all constituent units, which account for 100 mol %, in the resin component present in the polypropylene film. Here, the propylene unit fraction in the resin component can be measured using the generally known $^{13}$C-NMR method.

If the propylene unit fraction in the layer A is adjusted to 97.0 mol % or more, it serves to suppress the movement and relaxation of molecular chains on its surface to realize a very stable structure to resist heat at the vapor deposition step. Accordingly, if a laminated product is formed by adding layers including a vapor deposition layer and the layer D, which will be described later, it will have good water vapor barrier property, good oxygen barrier property, etc. In view of the above description, the lower limit of the propylene unit fraction in the layer A is preferably 99.0 mol % and more preferably 99.5 mol %. Here, the propylene unit fraction of 99.5 mol % or more in the layer A means that the molecular chains of the polypropylene based resin present in the layer A are substantially constituted only of the polypropylene unit despite impurities possibly contained in small amounts, and such a polypropylene based resin is occasionally referred to as a homopolypropylene resin.

There are no specific limitations on the method to use to adjust the propylene unit fraction in the layer A to 97.0 mol % or more and 100.0 mol % or less or in the aforementioned preferable range, but for example, a good method is to adopt a polypropylene based resin in which the propylene unit fraction in the layer A is 97.0 mol % or more and 100.0 mol % or less. In this case, an increase in the propylene unit fraction in the polypropylene based resin or an increase in the proportion of the polypropylene based resin in the layer A works to increase the propylene unit fraction in the layer A.

For the polypropylene film according to embodiments of the present invention, the polypropylene based resin that is the primary component of the layer A preferably has a melting point of 151° C. or more, more preferably 155° C. or more, still more preferably 160° C. or more, still more preferably 162° C. or more, particularly preferably 164° C. or more, and most preferably 166° C. or more. If the polypropylene based resin that is the primary component of the layer A has a melting point of 151° C. or more, a high crystallinity is maintained in the layer A and it serves to prevent the polypropylene film from being deformed significantly by the heat at the vapor deposition step.

For the second polypropylene film according to embodiments of the present invention to have both high lubricity and good barrier properties, it is important that Sa(A) and Sa(B) satisfy the equation 1 wherein Sa(A) and Sa(B) represent the surface roughness Sa of the layer A and that of the layer B, respectively. From the same viewpoint, it is important that Sa(A) and Sa(B) in the first polypropylene film according to embodiments of the present invention satisfy the equation 2.

$$Sa(B)/Sa(A) > 1.1 \qquad \text{equation 1}$$

$$Sa(B)/Sa(A) > 1.0 \qquad \text{equation 2}$$

Here, the surface roughness Sa is a parameter that represents the average of the absolute values of the differences in height measured at different points from the average plane of the surface as measured by a three dimensional noncontact surface profile measuring instrument, and its measurement can be performed by, for example, using the same measuring instrument as used for the measurement of Ssk. If the relation Sa(B)/Sa(A)>1.1 (for the second polypropylene film according to embodiments of the present invention) or Sa(B)/Sa(A)>1.0 (for the first polypropylene film according to embodiments of the present invention) is satisfied, it means that the surface of the layer B is rougher than the surface of the layer A and that the surface of the layer A is smoother than the surface of the layer B. If the surface of the layer B is rougher than the surface of the layer A, desirable slipperiness will be realized when winding up the polypropylene film. On the other hand, the surface of the layer A will be sufficiently smooth and, when forming the layer D, which will be described later, it will be possible for the layer D to have a uniform thickness while preventing defects such as pinholes and cracks from being formed in the layer D. Accordingly, this serves to allow the resulting laminated product that includes the layer D to have good water vapor barrier property, good oxygen barrier property, etc.

In view of the description given above, the polypropylene film according to embodiments of the present invention preferably satisfies the relation Sa(B)/Sa(A)>1.2, more preferably Sa(B)/Sa(A)>1.5, and still more preferably Sa(B)/Sa(A)>1.8, as the equation 1. For the polypropylene film according to embodiments of the present invention, the upper limit of the value of Sa(B)/Sa(A) is preferably 4.0, and more preferably 3.5, in order to ensure a good balance between lubricity and barrier property. If Sa(B)/Sa(A) is 4.0 or less, the surface of the layer B will be prevented from becoming excessively rough or having an excessively large number of asperities, and this prevents the layer D from being damaged significantly to suffer defects such as pinholes and cracks in the steps for vapor deposition etc., leading to the formation of a laminated product with good barrier properties. Here, to allow the first polypropylene film according to embodiments of the present invention to have a Sa(B)/Sa(A) value of more than 1.0 or in the aforementioned preferable range and to allow the second polypropylene film according to embodiments of the present invention to have a Sa(B)/Sa(A) value of more than 1.1 or in the aforementioned preferable range, those methods useful for adjusting the values of Ssk(A) and Ssk(B) can be adopted.

In order to serve as good packaging material, the polypropylene film according to embodiments of the present invention preferably has a thickness of more than 10 μm and 60 μm or less. If its thickness is more than 10 μm, the film will suffer little sagging during vapor deposition, conveyance, etc., and suffer little damage under tension. In view of the description given above, the lower limit of its thickness is more preferably 12 μm, still more preferably 14 μm, and particularly preferably 19 μm. On the other hand, if its thickness is 60 μm or less, it will have high handleability and its production cost can be reduced. In view of the description given above, the upper limit of the thickness is more preferably 50 μm and still more preferably 40 μm.

Here, the thickness of the polypropylene film can be measured using a contact type electronic micrometer in a 23° C. and 65% RH atmosphere. The contact type electronic micrometer may be, for example, an electronic micrometer (K-312A) manufactured by Anritsu Corporation.

There are no specific limitations on the method to use to adjust the thickness to more than 10 μm and 60 μm or less or in the aforementioned preferable range, and useful methods include, for example, adjusting the discharge rate in the step for melt-extruding a polypropylene based resin composition, adjusting the rotating speed of the casting drum in the cooling step for solidification of the molten sheet, adjusting the lip clearance of the die through which the molten sheet is discharged, adjusting the stretching ratio in the length direction, and adjusting the stretching ratio in the width direction. More specifically, a decrease in the thickness can be achieved by decreasing the extrusion rate, increasing the rotating speed of the casting drum, decreasing the lip clearance of the die, or increasing the stretching ratio in the length or width direction.

In addition, for the polypropylene film according to embodiments of the present invention, the thickness of the layer A is preferably 0.3 μm or more and 10 μm or less. If it is in this range, stretching can be performed easily even when the surface of the layer A in the polypropylene film has a low temperature, and it serves to realize a high degree of orientation and smoothness. Accordingly, when a laminated product is formed by adding the layer D by producing it by vapor deposition etc., the vapor deposition film will have a uniform thickness. Accordingly, the vapor deposition film will have improved quality and serve to form a laminated product having good water vapor barrier property, good oxygen barrier property, etc. In view of the description given above, the thickness of the layer A is more preferably 0.5 μm or more and 5.0 μm or less, and still more preferably 0.8 μm or more and 3.0 μm or less. Here, to adjust the thickness of the layer A, the same methods as mentioned above for the adjustment of the thickness to larger than 10 μm and 60 μm or less or in the preferable range may be adopted.

The thickness of the layer A can be determined by cutting the polypropylene film with a microtome to prepare an ultrathin section designed for observing the length-thickness-directional cross section and photographing it under a transmission electron microscope to provide a cross-sectional photograph to use for the determination. It should be noted that this thickness measuring method can be used not only for the layer A but also for the polypropylene film and each layer in the laminated product.

In order to allow the polypropylene film according to embodiments of the present invention to have an appropriate degree of slipperiness to suppress uneven deposition that may arise from creasing in the vapor deposition step and prevent the formation of creases in the bag making step, the coefficient of static friction ($\mu$s) between one surface and the other surface of the film, which will come in contact when two sheets of the film are laid one on the other, is preferably 0.3 or more and 1.0 or less. If $\mu$s is 0.3 or more, the film is not excessively high in slipperiness and it serves to decrease weaving of the film that can occur during winding in the film production process or during vapor deposition and bag-making steps. If $\mu$s is 1.0 or less, the film will not decrease significantly in slipperiness and it serves to ensure increased handleability while suppressing uneven deposition that may arise from creasing in the vapor deposition step and preventing the formation of creases in the bag making step. In view of the description given above, $\mu$s is more preferably 0.3 or more and 0.8 or less, and still more preferably 0.4 or more and 0.6 or less. Here, the coefficient of static friction ($\mu$s) can be determined according to JIS K 7125 (1999) at 25° C. and 65% RH. A good measuring instrument is, for example, the slip tester manufactured by Toyo Seiki Co., Ltd. (other measuring conditions are described in Examples).

Good methods to control the coefficient of static friction ($\mu$s) in the aforementioned range include, for example, blending the polypropylene based resin and the resin incompatible with the polypropylene based resin at a ratio in a preferable range, followed by stretching under properly adjusted conditions. Adoptable stretching conditions include sequential biaxial stretching at a stretching ratio of 4.0 or more, preferably 4.5 or more, in the length direction. They also include a length-directional stretching temperature of 125° C. or less, preferably 120° C. or less, more preferably 115° C. or less, and still more preferably 105° C. or less. Here, these stretching conditions may be adopted either singly or in combination.

For the polypropylene film according to embodiments of the present invention, the sum of the heat shrinkage rate in the length direction and that in the width direction after heat treatment performed at 125° C. for 10 minutes is preferably 4.0% or less, more preferably 3.5% or less, still preferably 3.0% or less, and most preferably 2.5% or less. There are no specific limitations on the lower limit, but it is about −2.0%. If the sum of the heat shrinkage rate in the length direction and that in the width direction of the film is 4.0% or less, when a laminated product containing a layer D formed by vapor deposition etc. is produced, the layer D will not be damaged significantly to suffer defects such as pinholes and cracks, which allows the laminated product to have good oxygen barrier property and good water vapor barrier property.

To conduct control so that the sum of the heat shrinkage rate in the length direction and that in the width direction after heat treatment performed at 125° C. for 10 minutes is 4.0% or less or in the aforementioned preferable range, a good method is to use a polypropylene material having a high mesopentad fraction and a small content of cold xylene solubles (CXS) and additionally perform appropriate heat fixation treatment and relaxation treatment on the film after biaxial stretching. It is also effective to increase the proportion of the incompatible resin in the layer B within the preferable range described above.

Here, in the case where it is not clear from the appearance of the film which direction is the length direction or the width direction in performing measurement of the heat shrinkage rate, a rectangular piece is sampled from the film and subjected to rupture strength (MPa) measurement using a tensile testing machine, and the direction where the maximum rupture strength occurs and the direction perpendicular to it are adopted as the width direction and the length direction, respectively. More specifically, the following procedure is carried out to determine the width direction and the length direction. First, a rectangular sample with a size of 20 mm or more (measuring direction)×10 mm is taken appropriately from the film, and its rupture strength (MPa) is measured using a tensile testing machine (such as Tensilon (registered trademark) UCT-100, manufactured by Orientec Co., Ltd.) under the conditions of a measuring length of 20 mm, tensile speed of 300%/min, and a measuring environment at 23° C. and 65% RH. Then, the sample is rotated clockwise by 15° and the same measuring procedure is carried out in an in-plane direction of the film. This is repeated to take measurements in 12 directions in total. Finally, the measured values are compared, and the measuring direction in which the maximum value of fracture strength (MPa) is obtained is regarded as the width direction, and the direction perpendicular thereto is regarded as the length direction.

Here, in the case where the sample size is so small that the rupture strength cannot be measured by the tensile testing machine, the crystal orientation of the α-crystal (110) plane in the polypropylene film is measured by wide angle X-ray diffraction as described below and the length direction and the width direction are determined according to the criterion given below. Specifically, an X-ray beam (CuKα radiation) is applied in the direction perpendicular to an appropriately selected film surface and the crystal peak at 2θ=about 14° (α-crystal (110) plane) is scanned in the circumferential direction. In the diffraction intensity distribution obtained, the direction in which the maximum diffraction intensity occurs is defined as the width direction and the direction perpendicular thereto is defined as the length direction.

The polypropylene film according to embodiments of the present invention is structurally stable against heat at the vapor deposition step, and after forming a transparent vapor deposition layer thereon in particular, it develops good water vapor barrier property and good oxygen barrier property, thus serving suitably to produce packaging materials. There are no specific limitations on the objects to be packed in the packaging materials produced from the polypropylene film according to embodiments of the present invention, but examples thereof include products liable to deterioration caused by water vapor, oxygen, etc., such as foodstuffs, drugs, and fresh flowers.

A polypropylene based resin to be used as primary component of the layer A in the polypropylene film according to embodiments of the present invention preferably has a mesopentad fraction of 0.93 or more. The mesopentad fraction is more preferably 0.95 or more, still more preferably 0.96 or more, and particularly preferably 0.97 or more. The mesopentad fraction is an indicator that represents the stereoregularity of the crystalline phase in a polypropylene based resin and is measured by nuclear magnetic resonance method (NMR method). If the polypropylene film according to embodiments of the present invention has a layer A that contains a polypropylene based resin with a mesopentad fraction of 0.93 or more as primary component, the layer A has a high degree of crystallinity and the polypropylene film (in the layer A in particular) has increased heat stability. As a result, when a polypropylene film is applied to the production of a packaging material, it serves to prevent thermal deformation from being caused by heat at the vapor deposition step and allow uniform stacking of type D layers including vapor deposition films to be realized easily, and the formation of defects such as pinholes and cracks in type D layers can also be suppressed. Accordingly, this serves to allow the resulting laminated product that includes the layer D to have enhanced water vapor barrier property and oxygen barrier property. There are no specific limitations on the upper limit of the mesopentad fraction of the polypropylene based resin used as the primary component of the layer A.

In regard to the polypropylene based resin used as the primary component of the layer A in the polypropylene film according to embodiments of the present invention, when the polypropylene film is once dissolved completely in xylene and then precipitated at room temperature, it is preferable for the polypropylene component dissolved in xylene (also referred to as CXS, cold xylene soluble fraction) to account for less than 4.0 mass %. Here, the cold xylene soluble (CXS) fraction is attributed to components that are difficult to crystallize because of, for example, a low stereoregularity or a low molecular weight. If CXS is adjusted to less than 4.0 mass %, it serves to improve the dimensional stability of a polypropylene film in a high temperature environment. Therefore, when a laminated product containing the layer D formed by vapor deposition etc. is produced, the layer D will not be damaged significantly to suffer defects such as pinholes and cracks, which allows the laminated product to have good oxygen barrier property and good water vapor barrier property. In view of the description given above, CXS is preferably 2.0 mass % or less, and more preferably 1.5 mass % or less. Useful methods for controlling the CXS fraction at less than 4.0 mass % or in the above preferable range include the method of enhancing the catalytic activity during the preparation of the polypropylene resin to use and the method of washing the resulting polypropylene resin with a solvent or the propylene monomer itself. There are no specific limitations on the lower limit of CXS, but practically it is 0.1 mass %. It is because a CXS fraction maintained at 0.1 mass % or more serves to suppress the decrease in stretchability in the film production process and decrease the frequency of film breakage. In a useful method for CXS determination, a specimen of 0.5 g is dissolved in 100 ml of xylene at 135° C., left to stand to cool, recrystallized for 1 hour in a constant temperature bath at 20° C., followed by performing filtration and determining the quantity of the dissolved polypropylene based component present in the filtrate by liquid chromatography.

The polypropylene based resins useful for forming the layer A in the polypropylene film according to embodiments of the present invention may be used singly or as a mixture of two or more thereof. When the layer D is formed by vapor deposition etc., an adhesive polypropylene resin may be added in order to develop interface adhesion between the layer D and the layer A. Here, for the resulting polypropylene film to suffer less deformation caused by heat in the vapor deposition step, it is preferable for the polypropylene based resin that is the primary component to have a melting point of 151° C. or more, more preferably 155° C. or more, still more preferably 160° C. or more, still more preferably 162° C. or more, particularly preferably 164° C. or more, and most preferably 166° C. or more. If the polypropylene based resin that is the primary component of the layer A has a melting point of 160° C. or more, a high crystallinity is maintained in the layer A and it serves to decrease the deformation of the polypropylene film that can be caused by heat at the vapor deposition step. More specifically, when forming a type D layer by vapor deposition etc., the layer D will not suffer significant defects such as pinholes and cracks, which allows the laminated product containing the layer D to have better water vapor barrier property and better oxygen barrier property.

In addition, the layer A of the polypropylene film according to embodiments of the present invention may include organic particles, inorganic particles, thermal stabilizer, crystal nucleating agent, chlorine scavenger, sliding agent, antistatic agent, anti-blocking agent, filler, viscosity adjustor, color protection agent, antioxidant, etc., as required. However, when a laminated product is formed by stacking layers including the layer D produced by vapor deposition etc., the contents of these components in the layer A are preferably as small as possible in order to allow the vapor deposition layer to have high uniformity and suppress the formation of defects such as pinholes. Specifically, it preferably accounts for 3 mass % or less, and more preferably 1 mass % or less, of all components present in the layer A.

For all of the layer A, layer B, and layer C (which will be described later), it is preferable from the viewpoint of film production performance that the polypropylene based resins used in the polypropylene film according to embodiments of the present invention have a melt flow rate (MFR) of 1 to 20 g/10 min, more preferably 2 to 10 g/10 min, and still more preferably 2 to 5 g/10 min, as measured at 230° C. under a load of 21.18 N. In order to allow the melt flow rate (MFR) measured under the above conditions to be in the above range, an adoptable method is, for example, controlling the average molecular weight or molecular weight distribution.

There are no specific limitations on the layer structure of the polypropylene film according to embodiments of the present invention as long as it is as follows: it has the layer A and the layer B; at least either of the outermost layers is the layer A, and the other outermost layer is the layer B. This means that it may have a 2-type 2-layer structure containing two different types of layers, i.e. the layer A and the layer B, or may have another layer between the layer A and the layer B. In the case where the layer A and the layer B sandwiches other layers, it is preferable, for example, that a layer containing a polypropylene based resin as primary component (layer C) is present between the layer A and the layer B.

If such a structure is adopted, the undermentioned components contained in the layer C will be prevented from bleeding out through the surface of the layer A on which a vapor deposition layer is to be formed. This facilitates the formation of a uniform vapor deposition layer. The simplest example of this structure is a 3-type 3-layer film having the structure [layer A/layer C/layer B], but another layer may be present between the layer A and the layer C or between the layer B and the layer C.

There are no specific limitations on the constitution of the layer C present in the polypropylene film according to embodiments of the present invention as long as it contains a polypropylene based resin as primary component, and it may also contain a polypropylene based resin having a long chain branched structure, petroleum resin, crystal nucleating agent, etc. It may further contain various additives including, for example, antioxidant, thermal stabilizer, chlorine scavenger, sliding agent, antistatic agent, filler, viscosity adjustor, and color protection agent unless they impair the purposes of the present invention. For the polypropylene film according to embodiments of the present invention, it is preferable for the layer C to contain a petroleum resin as compared with other components listed above. Here, the aforementioned petroleum resin is a petroleum resin that has a hydroxyl group, carboxyl group, halogen group, sulfone group, or a modification thereof, and that has no polar group, and specific examples thereof include cyclopentadiene based substances produced from petroleum based unsaturated hydrocarbons, and resins produced mainly from higher olefin based hydrocarbons.

If the layer C contains a petroleum resin, it works to enhance uniform stretching in the film production process to allow length-directional stretching to be performed at a temperature of 120° C. or less. Accordingly, this serves to facilitate increasing the heat resistance of the polypropylene film and also facilitate controlling the coefficient of static friction appropriately. Furthermore, if the layer C contains a petroleum resin, it serves to decrease the void volume in the amorphous region in the polypropylene based resin to allow the polypropylene film to have improved water vapor barrier property. In view of the description given above, it is preferable for the total content of the petroleum resin present in the layer C is preferably 2 mass % or more and mass % or less, more preferably 3 mass % or more and 15 mass % or less, and still more preferably 5 mass % or more and 10 mass % or less, relative to the total content, which account for 100 mass %, of all components of the layer C.

From the viewpoint of water vapor barrier property and productivity, it is preferable for the petroleum resin to have a softening point of 90° C. or more and 140° C. or less, and more preferably 100° C. or more and 130° C. or less. If it is in this range, it serves to allow the polypropylene film to improve easily not only in water vapor barrier property but also in uniform stretchability in the film production process. Specific examples of such a petroleum resin include T-REZ HA125 (softening point 125° C.), manufactured by JXT Eenergy, and Arkon (registered trademark) P125 (manufactured by Arakawa Chemical Industries, Ltd., softening point 125° C.).

In the polypropylene film according to embodiments of the present invention, the layer A constitutes one outermost layer while the layer B constitutes the other outermost layer, wherein the layer B acts for heat sealing in some cases. Heat sealing refers to a state (or a process for developing it) in which two films are melted by heating and pressure-bonded when they are processed into a bag to contain and package contents, and heat-sealability represents a characteristic of the film that is melted by heating and pressure-bonded.

For the polypropylene film according to embodiments of the present invention, it is preferable for the layer B to be a heat-sealable layer. Here, a heat-sealable layer means a layer having a heat-seal strength of 2 N/25.4 mm or more as measured by the method described later.

For the polypropylene film according to embodiments of the present invention, it is preferable from the viewpoint of developing low-temperature fast heat sealability that the layer B contain a polypropylene based resin that is lower in crystallinity and melting point than the polypropylene based resin contained as primary component in the layer A, and specific examples thereof include ethylene-propylene random copolymers, ethylene-propylene-butene random copolymers, and propylene-butene random copolymers.

From the viewpoint of developing low-temperature fast heat sealability, it is preferable for the layer B to have a melting point of 100° C. or more and less than 150° C., more preferably 110° C. or more and 148° C. or less, and still more preferably 120° C. or more and 145° C. or less. Here, to determine the melting point of the layer B, the layer B of the polypropylene film is examined by differential scanning calorimetry (DSC) while recording melting endothermic peaks, and the lowest of the measured peak temperatures is adopted. Here, it is important that the layer B of the polypropylene film according to embodiments of the present invention contain a resin that is incompatible with the aforementioned polypropylene based resin in order to develop moderate slipperiness without adding particles, lubricant, etc., but it may also contain various additives including, for example, antioxidant, thermal stabilizer, chlorine scavenger, antistatic agent, filler, viscosity adjustor, and color protection agent unless they impair the purposes of the present invention.

There are no specific limitations on the method to use for laying the layer B, and good methods include the use of a feedblock unit or a multimanifold unit for melt co-extrusion in a film production process, extrusion lamination, and dry lamination. From the viewpoint of production efficiency and cost, it is preferable to adopt a lamination process that uses the melt co-extrusion technique. There are no specific limitations on the thickness of the layer B of the polypropylene film, but the lower limit of the thickness of the layer B is preferably 0.5%, and more preferably 1%, of the total thickness of the polypropylene, which accounts for 100%. On the other hand, the upper limit of the thickness of the layer B is preferably 80%, more preferably 60%, and still more preferably 40%, of the total thickness of the polypropylene, which accounts for 100%.

Here, the polypropylene based resins used in the layer A, layer B, and layer C of the polypropylene film according to embodiments of the present invention may contain a bio-mass-derived polypropylene based resin. In the case of a polypropylene film containing a biomass derived polypropylene based resin, its content is preferably 5 mass % or more, and more preferably 10 mass % or more, relative to the total mass, which accounts for 100 mass %, of the polypropylene based resin present each layer. In addition, such a biomass-derived polypropylene preferably has a biomass degree of 10% or more. Furthermore, in the case where the polypropylene film according to embodiments of the present invention contains a resin component that is not a polypropylene based resin, that component may be a biomass-derived one. Here, the polypropylene film according to embodiments of the present invention may contain a polypropylene material recycled by a mechanical recycling process or a chemical recycling process. This can serve to reduce the environment load.

(Laminated Product)

Next, the laminated product according to embodiments of the present invention is described below. Here, the layer D is defined as a layer containing a metal and/or an inorganic compound that altogether account for more than 50 mass % and 100 mass % or less, and the laminated product according to embodiments of the present invention is characterized in that such a layer D is in contact with the layer A in the polypropylene film according to embodiments of the present invention and that the layer D has a thickness of 50 nm or less.

The laminated product according to embodiments of the present invention has the polypropylene film according to embodiments of the present invention and a layer (layer D) that contains a metal and/or an inorganic compound that altogether account for more than 50 mass % and 100 mass % or less. The adoption of this feature serves to realize good water vapor barrier property and good oxygen barrier property. Here, "a layer containing an inorganic compound or a metal in a proportion of more than 50 mass %" refers to a layer containing only a metal(s) in a proportion of more than 50 mass %, a layer containing only an inorganic compound(s) in a proportion of more than 50 mass %, or a layer containing both a metal(s) and an inorganic compound(s) in a proportion of more than 50 mass % in total, relative to the total mass, which accounts for 100 mass %, of all components present in the layer. Examples of such an inorganic compound or a metal used in the layer D include aluminum, aluminum oxide, silicon oxide, cerium dioxide, calcium dioxide, diamond-like carbon film, or mixtures thereof, which are preferable from the viewpoint of increased adhesion with polypropylene film, improved gas barrier property when laid on polypropylene film, and reduction in environment load.

The layer D in the laminated product according to embodiments of the present invention has a thickness of 50 nm or less, preferably 40 nm or less, more preferably 30 nm or less, and still more preferably 20 nm or less, from the viewpoint of recyclability for recycling the laminated product as resin or film and increased resistance to breakage to enhance the barrier properties. There are no specific limitations on the lower limit, but it is 1 nm from the viewpoint of developing barrier property.

To produce a laminated product by forming the layer D on the polypropylene film according embodiments of to the present invention, good methods include coating, vapor deposition, and lamination, of which vapor deposition is preferable because it has no humidity dependence and can form a thin film with good gas barrier property. Useful vapor deposition techniques include physical vapor deposition techniques such as vacuum vapor deposition, EB vapor deposition, sputtering, and ion plating, and various chemical vapor deposition techniques such as plasma CVD, of which the vacuum vapor deposition technique is used particularly preferably from the viewpoint of productivity.

The laminated product according to embodiments of the present invention preferably has a water vapor transmission rate of 2.0 g/m$^2$/day or less from the viewpoint of performance for storage of contents when used as packaging material. It is more preferably 1.0 g/m$^2$/day or less, and still more preferably 0.5 g/m$^2$/day or less. If it is in this range, when used as food packaging material in particular, it serves to prevent the contents from degradation due to moisture absorption or moisture desorption.

Furthermore, the laminated product according to embodiments of the present invention preferably has an oxygen transmission rate of 40 cc/m$^2$/day or less from the viewpoint of performance for storage of contents when used as packaging material. It is more preferably 30 cc/m$^2$/day or less, more preferably 20 cc/m$^2$/day or less, and most preferably 10 cc/m$^2$/day or less. If it is in this range, when used as food packaging material in particular, it serves to prevent the contents from degradation due to oxidation.

For the laminated product according to embodiments of the present invention, it is preferable that Ssk(D) be less than 5 where Ssk(D) is the skewness Ssk of the layer D measured with a noncontact type three dimensional surface roughness measuring instrument. If Ssk(D) is less than 5, a less number of asperities and a moderate number of valleys are present, and accordingly, the number of protruding asperities formed on the layer D by vapor deposition is small enough to form a vapor deposition layer with uniform height. As a result, the numbers of defects such as pinholes and cracks decrease to form a laminated product having enhanced barrier property. In view of the description given above, Ssk(D) is preferably 0 or less, more preferably −5 or less, and still more preferably −6 or less. There are no specific limitations on the lower limit, but it is −20 from the viewpoint of maintaining barrier property.

Good methods to control Ssk(D) in the aforementioned range include, for example, using a polypropylene based resin having a high degree of crystallinity (more specifically, a polypropylene based resin having a mesopentad fraction of 0.93 or more) as material, adjusting the temperature for cooling-solidification of the molten sheet to 30° C. or less in the film production process, performing sequential biaxial stretching at a stretching ratio of 4.0 or more, preferably 4.5 or more, in the length direction, adjusting the length-directional stretching temperature to 125° C. or less, preferably 120° C. or less, more preferably 115° C. or less, and still more preferably 110° C. or less, and adjusting the metal layer thickness to 50 nm or less in the step forming a layer D on the polypropylene film. Here, these methods may be adopted either singly or in combination.

<Packaging Material and Package>

The packaging material and package according to embodiments of the present invention are described below. The packaging material according to embodiments of the present invention is characterized by having at least either the polypropylene film according to embodiments of the present invention or the laminated product according to embodiments of the present invention. The packaging material according to embodiments of the present invention is structurally stable against heat at the vapor deposition step, and in particular, when a transparent vapor deposition layer is formed thereon, it develops good water vapor barrier property and good oxygen barrier property, thus serving suitably for packaging of materials liable to deterioration caused by water vapor, oxygen, etc.

The package according to embodiments of the present invention is characterized in that its contents are covered by the packaging material according to embodiments of the present invention. There are no specific limitations on the contents, but since the packaging material according to embodiments of the present invention has high transparency, good water vapor barrier property, and good oxygen barrier property, they are preferably an object that is required to be visible from outside and is liable to deterioration when exposed to water vapor, oxygen, etc. Here, the package according to embodiments of the present invention can be produced by covering an object by the packaging material according to embodiments of the present invention, and there are no specific limitations on the appearance. For example, it may be a package prepared by putting an object in a bag that is produced by processing the packaging material according to embodiments of the present invention by heat-sealing. Examples of such a package include snack food products and retort-pouched food products.

<Production Method>

A production method for the polypropylene film according to embodiments of the present invention is described below. In the production method for the polypropylene film according to embodiments of the present invention, a molten polypropylene based resin or a polypropylene based resin composition is first melt-extruded on a support to prepare an unstretched polypropylene film. Next, this unstretched polypropylene film is stretched in the length direction and then stretched in the width direction to achieve sequential biaxial stretching. Subsequently, heat treatment and relaxation treatment are performed to prepare a biaxially oriented polypropylene film. A more detailed description will be given later, but the polypropylene film and the production method therefor according to embodiments of the present invention should not be construed as being limited thereto.

First, polypropylene based resins or polypropylene based resin compositions to use as materials for the layer A, layer B, and layer C are melt-extruded from separate single screw extruders set at extrusion temperatures of 220° C. to 280° C., preferably 230° C. to 270° C., and filtrated through filters to remove foreign objects. Then, these molten resin streams are combined using a feedblock etc. into an intended layer structure (such as [layer a/layer c/layer b] where the layer a is the layer A in an unstretched state, the layer b being the layer B in an unstretched state, and the layer c being the layer C in an unstretched state). Subsequently, they are extruded through a slit-like die at temperatures of 200° C. to 260° C., preferably 210° C. to 240° C. Here, if the resins are melted sufficiently in the melt extrusion step to prevent molecular chains from being cut due to shear caused by screw rotation, it serves to stabilize the film structure while prevent its relaxation at high temperatures. In view of this, it is preferable that the equipment be set in such a manner that the temperature is high before filtration, that the temperature after the filtration is lower than that before filtration, and that the die temperature immediately before discharging is still lower, thereby realizing a stepwise temperature decrease.

Then, the molten resin sheet extruded from the slit-like die is cooled and solidified on a casting drum (cooling drum) having a surface temperature controlled at 10° C. to 40° C., preferably 10° C. to 35° C., more preferably 10° C. to 30° C., and most preferably 10° C. to 25° C., to provide an unstretched polypropylene film. In this step, it is preferable that the co-extruded lamination film formation be performed in such a manner that the layer A is the first of the layers in the molten sheet extruded from the die that comes in contact with the drum. If such temperature ranges and settings are adopted, the mesophase fraction in the unstretched polypropylene film will be particularly high in the surface region that is in contact with the drum (i.e. the layer A side surface) to allow the unstretched polypropylene film to have a mesophase structure. Accordingly, this allows the skewness Ssk and the surface roughness Sa of the layer A and the layer B to be controlled easily in intended ranges. As a result, the layer A in the resulting polypropylene film has a smooth surface, thereby allowing the layer D, which is formed by vapor deposition etc., to have a uniform thickness and achieve improved adhesion. Furthermore, useful methods to bring the molten sheet into firm contact with the casting drum include the application of static electricity, use of surface tension of water, the air knife method, the press roll method, casting into water, and the air chamber method. Any of these techniques may be used singly or a combination of a plurality thereof may be used, but the use of the air knife method is preferable because it ensures a high film planarity and serves for easy control of the skewness Ssk and the surface roughness Sa. When the air knife method is adopted, furthermore, it is preferable for the position of the air knife to be adjusted appropriately so that air will flow downstream in the film formation process, thereby preventing vibration of the film.

A mesophase is an intermediate phase between crystal and amorphous and it forms specifically when a molten material is solidified at a very high cooling speed. It is generally known that when a polypropylene based resin is cooled and solidified, it is crystallized to form spherulites. When an unstretched polypropylene film containing spherulites grown in this way is stretched, differences in stretching stress are thought to occur within individual spherulites and between crystal and amorphous regions located among the spherulites to cause local unevenness in stretching, which then leads to unevenness in thickness and structure. As compared with this, a material that is in a mesophase state will not form spherulites and will not suffer unevenness in stretching, and accordingly, it can be stretched highly uniformly and can form a film having a uniform thickness and a decreased surface roughness to ensure high uniformity. In the case of an unstretched film containing mesophase structures, stretching in the length direction (longitudinal stretching) can be performed at a lower temperature than in the case where the unstretched propylene film does not contain mesophase regions.

In particular, in the case of a laminated polypropylene film including the layer A that contains a polypropylene resin with a high stereoregularity and the layer B that contains a polypropylene resin and a thermoplastic resin incompatible with the polypropylene resin, if the layer A is in a mesophase state, it serves to increase the stretchability of the highly stereoregular polypropylene, which is normally difficult to stretch at low temperature. Therefore, it will be possible to realize enhanced film-forming property and allow the layer A to have a smooth surface even when stretching in the length direction is performed at a low temperature of, for example, 120° C. or less.

Then, the unstretched polypropylene film is stretched biaxially to achieve biaxial orientation. First, the unstretched polypropylene film is preheated by passing it between rollers maintained at a temperature between a lower limit of preferably 70° C., more preferably 80° C., and a upper limit of preferably 150° C., more preferably 130° C., and still more preferably 110° C. Next, in an environment maintained between a lower limit of preferably 70° C., more preferably 80° C., and an upper limit of preferably 125° C. or less, more preferably 120° C. or less, still more preferably 115° C. or less, and particularly preferably 105° C. or less, the unstretched polypropylene film is subjected to longitudinal stretching in the length direction at a stretching ratio of 2.0 times or more and 15 times or less, preferably 4.0 times or more and 10 times or less, more preferably 4.5 times or more and 8.0 times or less, and still more preferably 4.5 times or more and 6.0 times or less, followed by cooling to room temperature to provide a uniaxially oriented film.

Subsequently, the uniaxially oriented film is introduced into a tenter with both width-directional ends held by clips and it is stretched in the width direction (transverse stretching). In this step, the temperature (temperature for stretching in the width direction) is 150° C. to 175° C., and preferably 155° C. to 170° C. On the other hand, the stretching ratio in the width direction is preferably 8.5 times or more and 20.0 times or less, more preferably 9.0 times or more and 16.0 times or less, and still more preferably 10.0 times or more and 12.0 times or less. If the stretching ratio in the width direction is 8.5 times or more, the film can be highly oriented in the width direction to realize a large in-plane molecular chain tension while maintaining a highly oriented state in the length direction. Therefore, when producing a packaging material in particular, the film has increased structural stability against heat used in the vapor deposition step to permit the formation of a uniform vapor deposition film, thereby ensuring good water vapor barrier property and oxygen barrier property. In addition, if the stretching ratio in the width direction is 20.0 times or less, it serves to prevent film breakage from occurring in the film production process, leading to a high productivity.

Furthermore, for the production of the polypropylene film according to embodiments of the present invention, the areal stretching ratio is preferably 42.5 times or more and 100 times or less. The areal stretching ratio can be calculated by multiplying the stretching ratio in the length direction by the stretching ratio in the width direction. The lower limit of the areal stretching ratio is more preferably 45.0 times, and still more preferably 53.0 times.

For the production of the polypropylene film according to embodiments of the present invention, it is preferable to perform heat treatment and relaxation treatment after the transverse stretching step. With both width-directional edges held by clips of the tenter to maintain tension in the width direction, heat treatment and relaxation treatment are performed at a temperature of 140° C. or more and 170° C. or less, more preferably 152° C. or more and 168° C. or less, and more preferably 154° C. or more and 165° C. or less, while maintaining a relaxation of 2% or more and 20% or less. If such heat treatment and relaxation treatment are performed, it allows the film to improve in structural stability against heat and accordingly, it serves to prevent heat affection, i.e. the formation of defects such as pinholes and cracks, from occurring in the layer D in the step for producing a laminated product by forming the layer D by vapor deposition. As a result, the laminated product produced from the polypropylene film will have good water vapor barrier property and good oxygen barrier property.

In the relaxation treatment step, the relaxation rate is preferably 2% or more and 20% or less, more preferably 4% or more and 18% or less, and still more preferably 6% or more and 15% or less, in order to allow the film to have increased structural stability against heat. If the relaxation rate is less than 2%, the film fails to have a sufficiently high thermal dimensional stability in some cases. Accordingly, in the step for producing a laminated product by forming the layer D by vapor deposition, the film is deformed in some cases to cause defects such as pinholes and cracks in the layer D, and as a result, the laminated product that includes the layer D may suffer deterioration in water vapor barrier property or oxygen barrier property. If the relaxation rate is more than 20%, on the other hand, the film may be relaxed excessively in the tenter, leading to creasing in the film formation process, deterioration in mechanical characteristics, uneven deposition in the vapor deposition step, etc., in some cases.

After the heat treatment and relaxation treatment steps described above, the film is conveyed out of the tenter, released from the clips that holds both width-directional ends of the film in a room temperature atmosphere, and sent to a wind-up step where the film edges are cut off. Subsequently, in order to ensure good adhesion of the vapor deposition layer, the surface to be subjected to vapor deposition treatment during use (commonly the surface of the layer A) is preferably subjected to corona discharge treatment or plasma treatment in air or in a gaseous atmosphere of oxygen, nitrogen, hydrogen, argon, carbon dioxide gas, silane gas, or a mixture thereof. In particular, such treatment is performed preferably in nitrogen or in a mixed gas containing nitrogen. The polypropylene film according to embodiments of the present invention produced in this way is then wound up into a roll to provide a final roll product.

EXAMPLES

The present invention will now be illustrated more specifically with reference to examples, but the invention should not be construed as being limited to the embodiments described below. The evaluations for various items were carried out using the following methods.
<Methods for Measurement of Characteristic Values and Methods for Evaluation of Effects>
The methods for measurement of characteristic values and methods for evaluation of effects used for the present invention are as described below.

(1) Thickness of Polypropylene Film
Thickness measurements were taken at 10 randomly selected positions on a polypropylene film sample in a 23° C. and 65% RH atmosphere using a contact type electronic micrometer (model K-312A) manufactured by Anritsu Corporation. The arithmetic average of the thickness measurements taken at 10 positions was adopted as the thickness (in μm) of the polypropylene film.
(2) Skewness Ssk(A), Ssk(B), and Ssk(D)
Measurement of the skewness Ssk was performed by using a three dimensional noncontact surface profile measuring instrument, namely, scanning white light interference microscope VS1540, manufactured by Hitachi High-Tech Science Corporation. In addition, the waviness component is removed by performing planar correction of the photographed image by a polynomial quartic approximation technique using the attached analysis program, followed by median (3×3) filter processing and interpolation processing (for pixels lacking height data, corrections were made by calculation from height data of surrounding pixels). For each of the side B surface of the film (the surface of the layer B), the side A surface thereof (the surface of the layer A), and the side D surface (the surface of the layer D) in the case of a laminated product having a laminated inorganic compound layer or metal layer, measurements were taken at 5 appropriately selected points on the surface and their average was calculated. The measuring conditions used were as described below.
<Measuring Conditions>
Manufacturer: Hitachi High-Tech Science Corporation
Name of equipment: scanning white light interference microscope VS1540
Measuring conditions: objective lens 10×
lens tube 1×
zoom lens 1×
wavelength filter 530 nm white
Measuring mode: wave
Measuring software: VS-Measure version 10.0.4.0
Analysis software: VS-Viewer version 10.0.3.0
Measuring area: 0.561×0.561 mm²
(3) Surface Roughness Sa Sa(A) and Sa(B)
Measurement was performed using the same equipment, measuring conditions, measuring mode, measuring software, analysis software, and measuring area as in the section (2) "Skewness (Ssk)". For each of the side A surface and the side B surface of the film, measurements were taken at 5 appropriately selected points on the surface and their average was calculated.
(4) Layer Thickness of Layer a, Layer B, Layer C, and Layer D, i.e. Inorganic Compound Layer or Metal Layer, in Polypropylene Film
The film, or the laminated product in the case of a laminated product laminated with an inorganic compound layer or metal layer, was embedded in epoxy resin, and an ultrathin section designed for observing the length-thickness-directional cross section of the film was prepared using a microtome. The ultrathin section was observed and the cross section of the film was photographed at a magnification of 20,000× using a transmission electron microscope, and the thickness of each layer in the width-directional center portion of the film was determined. The thickness of the layer A, layer B, and layer C were measured in μm and the thickness of the layer D was measured in nm.
(5) Static Friction Coefficient (μs)
Using a slip tester manufactured by Toyo Seiki Seisakusho, Ltd., measurements were taken according to JIS K 7125 (1999) at 25° C. and 65% RH. Here, measurement was performed for film samples that were placed in such a manner that their lengths were aligned in the same direction and that different type surfaces of the film samples faced each other. The same test procedure was repeated five times and the average of the measurements was calculated to represent the static friction coefficient (μs) of the sample.

(6) Sum of Heat Shrinkage Rate in Length Direction and that in Width Direction in Heat Treatment at 125° C. for 10 Minutes The heat shrinkage rate of a polypropylene film in the length direction and that in the width direction were measured by the procedure described below. A rectangular film sample with a size of 70 mm length×10 mm width, in which the long side coincides the measuring direction, was cut out, and marks were made at positions 10 mm away from both ends to define a 50 mm test length, and the distance between the marks was measured using an all-purpose projector (V-16A) manufactured by Nikon Corporation and adopted as the test length (I0). Subsequently, a test piece was sandwiched between paper sheets and, without applying a load, heated for 10 minutes in an oven maintained at 125° C. It was then taken out and cooled at room temperature, followed by measuring the size (I1) in the same way. From the measurements I0 and I1 taken above, the heat shrinkage rate was calculated by the equation given below. The average of five measurements was adopted to represent the heat shrinkage rate in each direction and the sum was calculated.

$$\text{Heat shrinkage rate} = \{(I0 - I1)/I0\} \times 100(\%)$$

(7) Melting Point of Polypropylene Resin

In a differential scanning calorimeter (Exstar DSC6220, manufactured by Seiko Instruments Inc.), 3 mg of a polypropylene resin sample was heated in a nitrogen atmosphere at a rate of 20° C./min from 30° C. to 260° C. Then, the sample was maintained at 260° C. for 5 minutes and cooled at a rate of 20° C./min to 30° C. Furthermore, the sample was maintained at 30° C. for 5 minutes and heated at a rate of 20° C./min from 30° C. to 260° C. The temperature of the peak in the heat absorption curve recorded in this heating period was adopted as the melting point of the polypropylene resin. Here, if a plurality of peak temperatures were observed, the highest of the temperatures was adopted as the melting point of the polypropylene resin.

(8) Heat Sealability

A polypropylene film was put on a 12 μm thick stretched PET film (Lumirror (registered trademark) Type S10, manufactured by Toray Industries, Inc.) with the surface of the layer B facing the latter, and heat sealing was carried out using a flat plate heat sealer under the conditions given below to prepare a laminate. Using a Tensilon tester (registered trademark) manufactured by Orientec Co., Ltd., the interface between the polypropylene film according to embodiments of the present invention and the stretched PET film was examined by T-form peeling test to determine the heat seal strength. Here, a strip with a width of 20 mm and a length of 150 mm was cut out from the laminate for peeling test, and the heat seal strength was measured at a tension speed of 300 mm/min. The measuring run was repeated three times and the average of the measurements taken was calculated to give a value to represent the heat seal strength (N/25.4 mm). A sample was rated as acceptable (○) in terms of heat sealability if it achieved a heat seal strength of 2 N/25.0 mm or more or rated as unacceptable (x) in terms of heat sealability if its heat seal strength was less than 2 N/25.0 mm.

<Heat Seal Requirements>
  pressing pressure: 0.4 N/mm$^2$
  pressing time: 1 sec
  heater temperature: 120° C.

(9) Adhesion of Vapor Deposition Layer

A film roll was set in a vacuum vapor deposition apparatus equipped with a film driving mechanism and it was decompressed to a highly decreased pressure of $1.00 \times 10^{-2}$ Pa. Then, the film was driven to travel on cooling metal drums adjusted to 20° C. while aluminum metal was heated and evaporated to form a thin vapor deposition film layer on the layer A. In this step, the equipment was controlled so as to form a vapor deposition film of about 40 nm. After the end of vapor deposition, the vacuum vapor deposition apparatus was returned to atmospheric pressure, and the wound-up film was rewound and maintained in the form of a roll for aging at a temperature of 40° C. for 2 days, thus providing a laminated product that included a film and a vapor deposition layer of Al (aluminum) formed thereon. Then, Cello-tape (registered trademark) manufactured by Nichiban Co., Ltd. was adhered to the surface of the vapor deposition layer in the resulting laminated product using a rubber roller to apply a load of 2 kg, and it was peeled using a peel testing machine under the conditions of a peeling angle of 180° and a peeling speed of 3,000 m/min. After peeling the cellophane tape, the surface of the laminated product was observed visually, and the state of adhesion of the vapor deposition layer was evaluated according to the criteria given below. A sample was classified as good in terms of adhesion if rated as ○ or higher whereas it was classified as practically fair if rated as Δ.

(Criteria)
  ◎: vapor deposition layer not peeled at all
  ○: vapor deposition layer mostly unpeeled, but partly peeled
  Δ: vapor deposition layer partly unpeeled, but mostly peeled
  x: vapor deposition layer completely peeled

(10) Water Vapor Transmission Rate (Water Vapor Barrier Property) after Al Vapor Deposition or AlOx Vapor Deposition A laminated product having an Al vapor deposition surface was produced by the procedure described in the section (9). To produce a laminated product having an AlOx vapor deposition surface, a film roll was set in a vacuum vapor deposition apparatus equipped with a film driving mechanism and it was decompressed to a highly decreased pressure of $1.00 \times 10^{-2}$ Pa. Then, the film was driven to travel on cooling metal drums adjusted to 20° C. while introducing oxygen gas and causing a reaction and evaporation of AlOx, thereby forming a vapor deposition layer on the layer A. In this step, the equipment was controlled so as to form a vapor deposition layer of about 20 nm. After the end of vapor deposition, the vacuum vapor deposition apparatus was returned to atmospheric pressure, and the wound-up film was rewound and maintained in the form of a roll for aging at a temperature of 40° C. for 2 days, thus providing a laminated product that included a polypropylene film and a vapor deposition layer of AlOx formed thereon.

The laminated product having an Al or AlOx vapor deposition surface was subjected to measurement using a water vapor transmission rate measuring apparatus (PER-MATRAN-W3/30, manufactured by MOCON/Modern Controls) under the conditions of a temperature of and a humidity of 90% RH. Five measurements were taken from each sample and the average of the measurements was calculated and adopted to represent the water vapor transmission rate 25 26

(in g/m²/day) of the film. Based on the water vapor transmission rate determined above, the water vapor barrier property of the laminated product was evaluated according to the criteria given below. A sample was classified as good in terms of water vapor barrier property if rated as ◯ or higher whereas it was classified as practically fair if rated as Δ.

⊚: 0.5 g/m²/day or less
◯: more than 0.5 g/m²/day and 1.0 g/m²/day or less
Δ: more than 1.0 g/m²/day and 2.0 g/m²/day or less
x: more than 2.0 g/m²/day

(11) Oxygen Transmission Rate (Oxygen Barrier Property) after Al Vapor Deposition or AlOx Vapor Deposition A laminated product having an Al vapor deposition surface or an AlOx vapor deposition surface was produced by the procedure described in the section (9) or (10). Each laminated product was subjected to oxygen transmission rate measurement using an oxygen transmission rate measuring apparatus (Oxtran2/20, manufactured by MOCON/Modern Controls) under the conditions of a temperature of 23° C. and a humidity of 0% RH. Five measurements were taken from each sample and the average of the measurements was calculated and adopted to represent the oxygen transmission rate (in cc/m²/day) of the film. Based on the oxygen transmission rate determined above, the oxygen barrier property of the laminated product was evaluated according to the criteria given below. A sample was classified as good in terms of oxygen barrier property if rated as ◯ or higher whereas it was classified as practically fair if rated as Δ.

⊚: 10 cc/m²/day or less
◯: more than 10 cc/m²/day and 20 cc/m²/day or less
Δ: more than 20 cc/m²/day and 40 cc/m²/day or less
x: more than 40 cc/m²/day Components Used for Preparation of Polypropylene Film in Examples and Comparative Examples The components described below were used to prepare polypropylene films in Examples and Comparative examples. For MFR, measurement was performed at 230° C. under a load of 21.18 N unless otherwise specified.

(Polypropylene Based Resin for Layer A)
A1: homopolypropylene resin (F130A, manufactured by Prime Polymer Co., Ltd. (mesopentad fraction: 0.97, melting point: 167° C., MFR: 3.0 g/10 min, CXS: 1.5 mass %, propylene unit fraction: 99.5 mol % or more))
A2: homopolypropylene resin (F113G, manufactured by Prime Polymer Co., Ltd. (mesopentad fraction: 0.94, melting point: 162° C., MFR: 2.9 g/10 min, CXS: 3.8 mass %, propylene unit fraction: 99.5 mol % or more))
A3: ethylene-propylene random copolymer (WFW4M, manufactured by Japan Polypropylene Corporation (melting point: 135° C., MFR: 7.0 g/10 min, metallocene based, propylene content: 95.0%))
A4: homopolypropylene resin (manufactured by Repsol (melting point: 153° C., MFR: 3.0 g/10 min, CXS: 1.5 mass %, propylene unit fraction 99.5 mol % or more))

(Master Batch for Layer A)
AM1: A master batch prepared by kneading A2 (90 parts by mass), polymethylpentene based resin 2 (10 parts by mass), and an antioxidant (0.1 parts by mass) in an extruder adjusted to 260° C., extruding the mixture therefrom, cooling the resulting strand in water, and cutting it into chips.

(Polypropylene Based Resin for Layer B)
B1: ethylene-propylene random copolymer (WFWST, manufactured by Japan Polypropylene Corporation (melting point: 130° C., MFR: 3.5 g/10 min, metallocene based)
B2: homopolypropylene (same as A1)

(Master Batch for Layer B)
BM1: A master batch prepared by kneading B1 (90 parts by mass), polymethylpentene based resin 1 (10 parts by mass), and an antioxidant (0.1 parts by mass) in an extruder adjusted to 260° C., extruding the mixture therefrom, cooling the resulting strand in water, and cutting it into chips.
BM2: A master batch prepared by kneading B1 (90 parts by mass), polymethylpentene based resin 2 (10 parts by mass), and an antioxidant (0.1 parts by mass) in an extruder adjusted to 260° C., extruding the mixture therefrom, cooling the resulting strand in water, and cutting it into chips.
BM3: A master batch prepared by kneading B2 (90 parts by mass), polymethylpentene based resin 1 (10 parts by mass), and an antioxidant (0.1 parts by mass) in an extruder adjusted to 260° C., extruding the mixture therefrom, cooling the resulting strand in water, and cutting it into chips.

(Polypropylene Based Resin for Layer C)
C1: homopolypropylene resin (HA3105, manufactured by Basell (melting point: 165° C., MFR: 3.0 g/10 min, CXS: 2.5 mass %, propylene unit fraction: 99.5 mol % or more))
C2: homopolypropylene resin (FY6H, manufactured by Japan Polypropylene Corporation (mesopentad fraction: 0.92, melting point: 161° C., MFR: 3.3 g/10 min, CXS: 4.1 mass %, propylene unit fraction 99.5 mol % or more))

(Master Batch for Layer C)
CM1: A master batch prepared by kneading C1 (70 parts by mass), petroleum resin 1 (30 parts by mass), and an antioxidant (0.1 parts by mass) in an extruder adjusted to 240° C., extruding the mixture therefrom, cooling the resulting strand in water, and cutting it into chips.
CM2: A master batch prepared by kneading C2 (70 parts by mass), petroleum resin 1 (30 parts by mass), and an antioxidant (0.1 parts by mass) in an extruder adjusted to 240° C., extruding the mixture therefrom, cooling the resulting strand in water, and cutting it into chips.

(Resins Other than Polypropylene Based Resin)
Polymethylpentene based resin 1: TPX (registered trademark), manufactured by Mitsui Chemicals, Inc. (DX845, melting point: 232° C., MFR: 9 g/10 min (determined at assumed temperature of 260° C.))
Polymethylpentene based resin 2: TPX (registered trademark), manufactured by Mitsui Chemicals, Inc. (MX004, melting point: 228° C., MFR: 25 g/10 min (determined at assumed temperature of 260° C.))
Petroleum resin 1: T-REZ HA125 (manufactured by JXTG Nippon Oil & Energy Corporation)

(Additive Etc.)
Antioxidant: Irganox (registered trademark) 1010 (manufactured by BASF Japan Ltd.)
P1: silica particle (SFP-20MHE (silane coupling surface treatment), manufactured by Denki Kagaku Kogyo Kabushiki Kaisha) (average particle diameter: 0.3 μm)

Example 1

A1 was used as material for the layer A. A 80:20 (by mass) mixture of B1 and BM1 was used as material for the layer B. A 75:25 (by mass) mixture of C1 and CM1 was used as material for the layer C. These materials were fed to separate single screw extruders, melt-extruded at 260° C., and filtered through a sintered filter with a 80 μm pore diameter to remove foreign objects. Then, while adjusting the extrusion rate using a feedblock to form a stack of A/C/B type three layers with a layer stacking ratio of 1/23/1, the molten polymer layers were discharged from a T-die. Subsequently, the discharged molten sheet was brought into firm contact with a casting drum maintained at 20° C. by using an air knife in such a manner that the layer A touched the drum surface. Thus, it was cooled and solidified to form an unstretched sheet. Next, the unstretched sheet was preheated to 105° C. using a group of several rolls and passed between rolls with different circumferential speeds to achieve 5.2-fold stretching in the length direction to form an uniaxially oriented film. Then, the resulting uniaxially oriented film was introduced into a tenter and, with the width-directional ends of the film held by clips, it was stretched 10.5 times at 165° C. in the width direction, and then heat-treated at 155° C. while relaxing it by 10% in the width direction. Subsequently, the film was conveyed out of the tenter and released from the clips that held both width-directional ends of the film, and then the film surface (that was in contact with the casting drum, i.e. the layer A) was subjected to corona discharge treatment at a treatment strength of 25 W·min/m$^2$ in a mixed gas atmosphere of carbon dioxide gas and nitrogen gas with a carbon dioxide gas concentration adjusted to 15 vol %. Finally, the biaxially oriented polypropylene film with a thickness of 25 μm thus produced was wound up into a roll. In addition, a laminated product was produced by forming an Al vapor deposition layer as the layer D on the layer A of the film prepared in this Example. Characteristics of the biaxially oriented polypropylene film and the laminated product produced above are shown in Table 1.

Example 2

A biaxially oriented polypropylene film was prepared by the same procedure as in Example 1, and a laminated product was produced by forming an AlOx vapor deposition layer as the layer D on the layer A of the film. Characteristics of the biaxially oriented polypropylene film and the laminated product produced above are shown in Table 1.

Examples 3 to 10 and Comparative Examples 2 to 4

Except for using material components for layer and the film production conditions specified in Table 1, the same procedure as in Example 2 was carried out to produce a biaxially oriented polypropylene film and a laminated product. Characteristics of the biaxially oriented polypropylene film and the laminated product produced above are shown in Table 1.

Comparative Example 1

As the material for the layer A, A1 was supplied into a single screw extruder, melt-extruded at 250° C., filtered through a sintered filter with a 80 μm pore diameter to remove foreign objects, and then discharged from a T-die. Subsequently, the discharged molten sheet was brought into firm contact with a casting drum maintained at 30° C. by using an air knife. Thus, it was cooled and solidified to form an unstretched sheet. Next, the unstretched sheet was preheated to 135° C. using a group of several rolls and passed between rolls with different circumferential speeds to achieve 4.5-fold stretching in the length direction to form an uniaxially oriented film. Then, the resulting uniaxially oriented film was introduced into a tenter and, with the width-directional ends of the film held by clips, it was stretched 8.2 times at 160° C. in the width direction, and then heat-treated at 168° C. while relaxing it by 6.7% in the width direction. Subsequently, the film was conveyed out of the tenter and released from the clips that held both width-directional ends of the film, and then the film surface (that was in contact with the casting drum, i.e. the layer A) was subjected to corona discharge treatment at a treatment strength of 25 W·min/m$^2$ in a mixed gas atmosphere of carbon dioxide gas and nitrogen gas with a carbon dioxide gas concentration adjusted to 15 vol %. Finally, the biaxially oriented polypropylene film with a thickness of 25 μm thus produced was wound up into a roll. Characteristics of the biaxially oriented polypropylene film and the laminated product produced above are shown in Table 1.

Comparative Example 5

A 80:20 (by mass) mixture of A2 and AM1 was used as material for the layer A. A 80:20 (by mass) mixture of A2, i.e. the same material as for the layer A, and AM2 was used as material for the layer B. C1 was used as material for the layer C. These materials were fed to separate single screw extruders, melt-extruded at 260° C., and filtered through a sintered filter with a 80 μm pore diameter to remove foreign objects. Then, while adjusting the extrusion rate using a feedblock to form a stack of A/C/B type three layers with a layer stacking ratio of 1/22/1, the molten polymer layers were discharged from a T-die. Except for replacing the film production conditions with those specified in Table 1, the same procedure as in Example 2 was carried out to produce a biaxially oriented polypropylene film and a laminated product. Characteristics of the biaxially oriented polypropylene film and the laminated product produced above are shown in Table 1.

TABLE 1

| | | | Example 1 | Example 2 | Example 3 | Example 4 | Example 5 | Example 6 | Example 7 | Example 8 | Example 9 | Example 10 | Comparative example 1 | Comparative example 2 | Comparative example 3 | Comparative example 4 | Comparative example 5 |
|---|---|---|---|---|---|---|---|---|---|---|---|---|---|---|---|---|---|
| material and film production conditions | structure | — | A/C/B | A/C/B | A/B | A/C/B | A/C/B | A/C/B | A/C/B | A/C/B | A/C/B | A/C/B | A | A/C/B | A/C/B | A/C/B | A/C/B |
| | layer stacking ratio | — | 1/23/1 | 1/22/1 | 21/2 | 1/15/1 | 1/23/1 | 1/15/1 | 2/21/2 | 1/18/1 | 1/16/1 | 1/13/1 | 1 | 1/15/1 | 1/12/3 | 1/18/1 | 1/22/1 |
| | material for layer A | mass ratio | A1 = 100 | A1 = 100 | A1 = 100 | A1 = 100 | A1 = 100 | A2 = 100 | A1 = 100 | A1 = 100 | A1/ AM1 = 90/10 | A4 = 100 | A1 = 100 | A1 = 100 | A1/P1 = 99/1 | A3 = 100 | A2/ AM1 = 80/20 |
| | material for layer C | mass ratio | C1/ CM1 = 75/25 | C1/ CM1 = 75/25 | — | C1/ CM1 = 60/40 | C1/ CM1 = 70/30 | C1/ CM1 = 60/40 | C1 = 100 | C1/ CM1 = 75/25 | C1/ CM1 = 75/25 | C1/ CM1 = 75/25 | — | C1/ CM1 = 75/25 | C1/ CM1 = 75/25 | C1/ CM2 = 70/30 | C1 = 100 |
| | material for layer B | mass ratio | B1/ BM1 = 80/20 | B1/ BM1 = 80/20 | B1/ BM1 = 70/30 | B1/ BM1 = 30/70 | B1/ BM1 = 80/20 | B1/ BM1 = 96/4 | B1/ BM1 = 80/20 | B1/ BM1 = 80/20 | B1/ BM1 = 80/20 | B1/ BM1 = 80/20 | — | B1 = 100 | B1/P1 = 99/1 | B1/ BM1 = 80/20 | A2/ AM1 = 80/20 |
| | content of incompatible thermoplastic resin in layer B | mass % | 2 | 2 | 3 | 7 | 2 | 0.5 | 2 | 2 | 2 | 2 | 0 | 0 | 0 | 2 | 2 |
| | casting drum temperature | °C | 20 | 20 | 25 | 22 | 20 | 33 | 21 | 24 | 20 | 20 | 30 | 25 | 31 | 28 | 25 |
| | temperature for stretching in length direction | °C | 105 | 105 | 125 | 115 | 108 | 97 | 138 | 108 | 107 | 108 | 135 | 115 | 111 | 111 | 145 |
| | stretching ratio in length direction | times | 5.2 | 5.2 | 4.8 | 4.5 | 5.0 | 4.0 | 5.2 | 5.0 | 5.1 | 5.0 | 4.5 | 5.0 | 5.0 | 5.1 | 4.2 |
| | stretching ratio in width direction | times | 10.5 | 10.5 | 10.8 | 9.9 | 9.5 | 8.8 | 10.1 | 10.3 | 10.4 | 10.3 | 8.2 | 10.6 | 8.1 | 10.2 | 8.8 |
| characteristics of film | propylene unit fraction in layer A | mol % | 99.5 or more | 99.5 or more | 99.5 or more | 99.5 or more | 99.5 or more | 99.5 or more | 99.5 or more | 99.5 or more | 99.5 or more | 99.5 or more | 99.5 or more | 99.5 or more | 99.5 or more | 95.0 | 98.0 |
| | propylene unit fraction in layer A > propylene unit fraction in resin component in entire film | — | yes | yes | yes | yes | yes | yes | yes | yes | yes | yes | yes | yes | yes | yes | no |
| | skewness Ssk(A) | — | -8 | -8 | -7 | -3 | -7 | 1 | -8 | -8 | -1 | -2 | -6 | -7 | -8 | 6 | 8 |
| | skewness Ssk(B) | — | 11 | 11 | 12 | 21 | 13 | 6 | 7 | 11 | 18 | 12 | 3 | -13 | -9 | 10 | 12 |
| | film thickness | μm | 25 | 24 | 23 | 17 | 25 | 17 | 25 | 20 | 18 | 15 | 25 | 17 | 16 | 20 | 24 |
| | surface roughness Sa(B)/Sa(A) | — | 2.0 | 2.0 | 2.2 | 4.0 | 1.9 | 1.2 | 1.2 | 2.0 | 1.4 | 1.3 | 1.1 | 1.0 | 1.0 | 2.5 | 1.1 |
| | static friction coefficient | μs | 0.5 | 0.5 | 0.7 | 0.3 | 0.6 | 0.9 | 0.8 | 0.5 | 0.4 | 0.4 | 1.0 | 1.4 | 0.4 | 0.6 | 0.5 |

TABLE 1-continued

| | | Example 1 | Example 2 | Example 3 | Example 4 | Example 5 | Example 6 | Example 7 | Example 8 | Example 9 | Example 10 | Comparative example 1 | Comparative example 2 | Comparative example 3 | Comparative example 4 | Comparative example 5 |
|---|---|---|---|---|---|---|---|---|---|---|---|---|---|---|---|---|
| sum of heat shrinkage rate in length and width directions at 125° C. for 10 min | % | 3.3 | 3.3 | 2.5 | 3.6 | 3.3 | 3.6 | 3.6 | 3.2 | 3.3 | 3.4 | 2.8 | 3.3 | 3.3 | 4.3 | 3.3 |
| characteristics of laminated product — heat sealability | — | ○ | ○ | ○ | ○ | ○ | ○ | ○ | X | ○ | ○ | X | ○ | ○ | ○ | X |
| thickness of layer D | nm | 38 | 10 | 18 | 21 | 18 | 22 | 18 | 15 | 11 | 10 | 8 | 9 | 8 | 9 | 8 |
| skewness Ssk(D) | — | -6 | -8 | -7 | -3 | -7 | 1 | -5 | -7 | -1 | -2 | -5 | -7 | -9 | 6 | 8 |
| adhesion of Al vapor deposition layer | — | ◎ | — | — | — | — | — | — | — | — | — | — | — | — | — | — |
| water vapor transmission rate after Al vapor deposition | — | ◎ | — | — | — | — | — | — | — | — | — | — | — | — | — | — |
| oxygen transmission rate after Al vapor deposition | — | ◎ | — | — | — | — | — | — | — | — | — | — | — | — | — | — |
| water vapor transmission rate after AlOx vapor deposition | — | — | ◎ | ○ | △ | ◎ | △ | ○ | ◎ | ○ | ○ | X | X | X | X | X |
| oxygen transmission rate after AlOx vapor deposition | — | — | ◎ | ◎ | ○ | ◎ | △ | △ | ◎ | ○ | ○ | X | X | X | X | △ |

The film prepared in Comparative example 1 had a monolayer structure and accordingly, the layer constituting the film was regarded as the layer A. The films prepared in Comparative examples 2 and 3 did not contain a thermoplastic resin that is incompatible with the polypropylene based resin, but the layer containing B1 as primary component was regarded as the layer B. In Comparative example 5, the propylene unit fraction in the layer A was calculated on the assumption that the propylene unit fraction of A2 was 100 mol %.

The propylene film according to embodiments of the present invention is structurally stable against heat used in the vapor deposition step and has moderate slip property that is developed without using an anti-blocking agent, particles, or the like, and accordingly, it shows good water vapor barrier property and oxygen barrier property, particularly after forming transparent vapor deposition layer thereon. Therefore, it can be used suitably as packaging material.

The invention claimed is:

1. A polypropylene film comprising at least two layers comprising a layer A and a layer B that contain polypropylene based resins as primary components wherein the layer B contains a polymethylpentene based resin having a melting point of 185° C. to 240° C. that is incompatible with the polypropylene based resins and wherein Ssk(B) is 5 or more and Ssk(A) is less than 5 where Ssk(A) and Ssk(B) are the skewness Ssk of the layer A and that of the layer B, respectively, as determined by using a three dimensional noncontact surface profile measuring instrument.

2. The polypropylene film as set forth in claim 1, wherein the propylene unit fraction in the resin component present in the layer A is 97.0 mol % or more and 100.0 mol % or less and is equal to or greater than the propylene unit fraction in the resin component present in the entire polypropylene film.

3. The polypropylene film as set forth in claim 1, wherein the polypropylene based resin that is the primary component of the layer A has a melting point of 151° C. or more.

4. The polypropylene film as set forth in claim 1, wherein Sa(A) and Sa(B) meet the equation 2 where Sa(A) and Sa(B) are the surface roughness Sa of the layer A and that of the layer B, respectively:

$$Sa(B)/Sa(A) > 1.0 \qquad \text{equation 2.}$$

5. The polypropylene film as set forth in claim 1, wherein the layer B is a heat-sealable layer.

6. The polypropylene film as set forth in claim 1 further comprising a layer C containing a polypropylene based resin as primary component between the layer A and the layer B.

7. The polypropylene film as set forth in claim 6, wherein the layer C contains a petroleum resin.

8. The polypropylene film as set forth in claim 1 that is intended for use as packaging material.

9. A laminated product comprising a layer, hereafter referred to as a layer D, containing a metal and/or an inorganic compound that altogether account for more than 50 mass % and 100 mass % or less with respect to a total mass of the layer D, wherein the layer D is in contact with the layer A in a polypropylene film as set forth in claim 1 and wherein the layer D has a thickness of 50 nm or less.

10. The laminated product as set forth in claim 9, wherein Ssk (D) is less than 5 where Ssk (D) is the skewness Ssk of the layer D as measured with a noncontact type three dimensional surface roughness measuring instrument.

11. A packaging material comprising a laminated product as set forth in claim 9.

12. A package containing contents covered by the packaging material as set forth in claim 11.

* * * * *